United States Patent [19]

Jiskoot

[11] Patent Number: 4,488,570

[45] Date of Patent: Dec. 18, 1984

[54] BLENDING APPARATUS AND METHOD

[75] Inventor: Joost J. Jiskoot, Tunbridge Wells, England

[73] Assignee: Jiskoot Autocontrol Limited, Tunbridge Wells, England

[21] Appl. No.: 504,433

[22] Filed: Jun. 15, 1983

[30] Foreign Application Priority Data

Jun. 16, 1982 [GB] United Kingdom ................ 8217442

[51] Int. Cl.³ ............................................ F16K 19/00

[52] U.S. Cl. .................................... 137/238; 137/606

[58] Field of Search ................ 137/238, 239, 606, 607

[56] References Cited

U.S. PATENT DOCUMENTS 564,383 7/1896 Lewis ............................ 137/606 X 4,163,523 8/1979 Vincent .......................... 137/606 X 4,257,439 3/1981 Mayeaux ......................... 137/606 X

FOREIGN PATENT DOCUMENTS 648091 12/1950 United Kingdom ................ 137/606

*Primary Examiner*—Robert G. Nilson

*Attorney, Agent, or Firm*—Staas & Halsey

[57] ABSTRACT

An in-line blender for blending components, in the form of liquid or other fluent materials including a pipeline having a plurality of injection points, each injection point being connected to a set of selector valves and each selector valve being connected to a separate component source. Only one of these selector valves at a time is connected to the injection point. Between the set of valves and the injection point there is mounted a metering apparatus in the form of a positive displacement pump and a meter 14.

7 Claims, 5 Drawing Figures

BLENDING APPARATUS AND METHOD

BACKGROUND OF THE INVENTION

The present invention relates to a blending apparatus and method therefor. The apparatus and method will be described with respect to the blending of petroleum products but is applicable to the blending of other liquid or fluent materials such as, for example, food ingredients and the word "component" should be interpreted to include these materials.

1. Field of the Invention

When it is desired to produce a blended product from a number of components there are basically two ways of carrying out the blending operation. Firstly, a batch blending method passes measured quantities of component into, for example, a tank and then mixes them and when the mixing is completed the blended product is passed to a storage tank. The measuring of the various components can be carried out in a number of ways, for example in the case of liquid components by means of valves which may measure volume. In modern arrangements, however, the gathering of the component materials is often carried out by means of robots. Such an apparatus and method has considerable use particularly where relatively small quantities of blended product are to be produced.

In an alternative arrangement, the blended product may be produced by a method known a "in-line" blending in which the components are passed to a single line and are added to that line in a metered manner in accordance with their relative proportions in the final blended product. Such an in-line blending process is widely used and although not restricted thereto is particularly desirable when large quantities of blended products are to be produced.

The same apparatus may be used to produce different blended products by blending different components or by blending the same components in different proportions.

2. Description of the Prior Art

FIG. 1 illustrates diagrammatically a plan view of a typical installation for in-line blending. In this the components A to F from which the blended products are to be produced are stored separately in respective tanks 10A to 10F. Each tank 10A to F is connected by a respective pipeline 11A to F, via a stop valve 12A to F, a pump 13A to F (which may be a positive displacement pump), a flow meter 14A to F (which may be a turbine flow meter), and a check valve 15A to F, to an injection point 17A to F in a pipeline called a "blend header" 16 having an outlet 20 for the blended product. Control apparatus is provided to operate the pumps 13A to F in accordance with a predetermined relation which in general terms will be in proportion to the desired relative proportions of the components in the blended product. The rate of addition of the particular component is measured by means of the flow meter 14A to F which can in turn control the pump 13A to F. Clearly such an arrangement can be used to produce a wide variety of blended products by varying the porportion of components added from zero upwards. Thus, for example, in one application it may only be required to blend components A, B and C from tanks 10A, B and C in which case valves 11D, E and F can be closed. Furthermore, by means of a hose exchange 18A (not shown in FIG. 1 but situated between stop valves 12 and pumps 13) an individual pump 13A may be connected to different tanks at different times so that there is no need to have a dedicated pump 13 and meter 14 for each component tank.

FIG. 2 shows one of the lines 11A between a hose exchange 18A and the blend header 16 in more detail. FIG. 2 illustrates the hose exchange 18A already referred to, a further isolating valve 19A, a strainer 21A, the positive displacement pump 13A, an air eliminator 22A, the meter 14A and the check valve 15A. In prior arangements these have generally been arranged in a generally horizontal configuration and it will be noted in particular that the strainer 21A and air eliminator 22A by virtue of their design have sumps below the level of the line 11A. The strainer 21A protects the downstream pump and meter, and the air eliminator 22A ensures disposal of air "slugs" and being the highest point in the metering stream the normal vent is converted to allow blowback of the unmetered liquid back to storage.

The above described arrangement has been well known for a number of years and has worked quite effectively. However, there have been a number of problems with such an arrangement. The primary problem is that when a different component is attached to the hose exchange 18 the earlier component which is already in the line 11A, the strainer 21, the pump 13, the air eliminator 22 and the meter 14 will now be considered to be a contaminant since it will not be required in the new blended product. This means that the initial quantity of blended product which is produced after a different component is attached to the hose exchange 18 must be discarded or considered to be contaminated.

One of the most popular ways to remove as much as possible of the old component from the line 11A before the new component is passed to the hose exchange 18 has been to isolate check valve 15A by closing a closure valve (not shown) associated with check valve 15A and to pass air into the system via the air eliminator 22A to try to blow the old component back through the various parts to the hose exchange 18 and hence back to its relevant tank before disconnecting the hose exchange. In practice, however, it has been found that quite a lot of the original component remains.

Furthermore, using the hose exchange 18A is very labour intensive and far from foolproof unless some complicated electronic identification means is incorporated.

SUMMARY OF THE INVENTION

The present invention provides an in-line blender for blending components in the form of liquid or other fluent materials comprising a pipeline having a plurality of injection points, a respective set of selector valves in series with and adjacent to one another connected to each injection point, each selector valve being movable between a first position for connecting an outlet of the selector valve with a respective component and a second position, for interconnecting the selector valve with the downstream and upstream selector valves, the selector valve of each set of selector valves which is furthest downstream being connected to a metering apparatus and thence for the associated injection point, and means to controlling the selector valves, only one of the selector valves in each set of selector valves is in the first position and the others are in the second position during operation and so that, for each set of selector valves, the component from said only one of the selector valves is metered to the associated injection point.

An advantage of this arrangement is that the selector valves can be permanently connected to the component supply and there is therefore no need to use a hose exchange although in practice it is preferred that one of the selector valves is connected to a hose exchange for exceptional use. Thus the use of the hose exchange which is labour intensive and has the problems outlined above can be eliminated or reduced.

The selector valves are preferably "T" valves and the selector valves in each set are preferably arranged vertically above one another. This provides a conveniently compact arrangement and also means that if air is inserted from above the selector valves during cleaning of the apparatus, the component in the relative selector valve can be substantially completely removed by the air supply and any material clinging to the walls of the selector valves will naturally drain downwards and out of the system. A drain cap can, if required, be provided at the bottom of the vertical arrangement of selector valves to further assist draining of the system.

A positive displacement pump and a meter are preferably connected vertically above each set of selector valves. Once again, an advantage of this arrangement is that a supply of air above these parts will clean them in the same way as described with respect to the selector valves.

To prevent damage to the meter, a bypass may be mounted around each meter so that in use the majority of air provided downstream of the meter to clean the system will bypass the meter and when the system is filling up again the majority of component will initially pass around the meter.

Above each meter there may be provided a member through which air may be inserted as described above and also through which the air which has been inserted is vented when the apparatus is reconnected to pass the component to be blended to prevent the air passing into the pipeline.

In a further improvement, a strainer is provided between each selector valve and its supply of component. In this way the strainer does not have to be cleaned of component each time the component is changed.

The present invention will be more apparent with reference to the accompanying drawings wherein:

DESCRIPTION OF THE PREFERRED EMBODIMENT

A preferred embodiment of the invention will now be described by way of example only and with reference to FIGS. 3 and 4.

Figure 1:
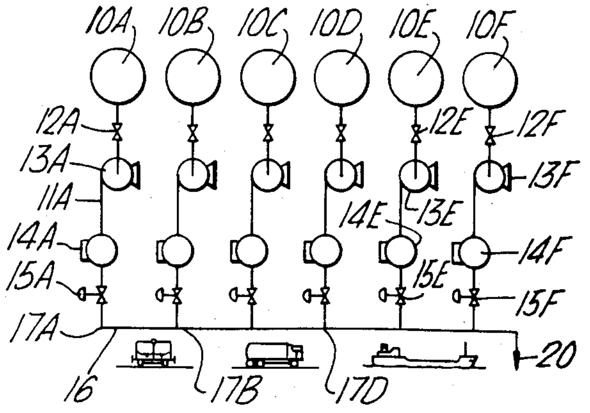
Fig. 1. (PRIOR ART)
FIG. 1 is a diagrammatic plan view of a conventional installation for in-line bleeding.
Figure 2:
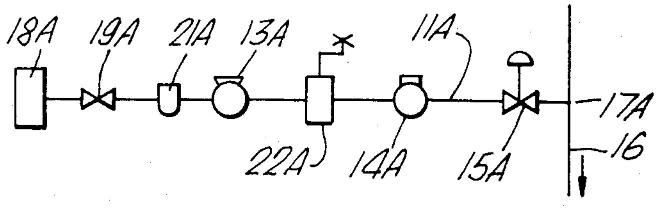
Fig. 2. (PRIOR ART)
FIG. 2 is a diagram showing one of the lines 11A-11F of FIG. 1 in more detail.
Figure 3:
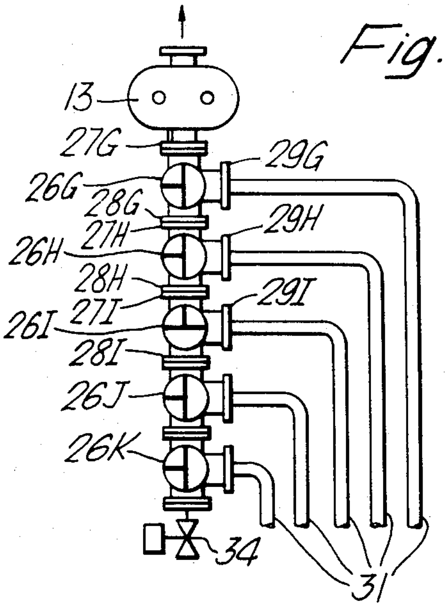
FIG. 3 is a diagrammatic side view of a part of the apparatus of the invention incorporating the selector valves.
Figure 4:
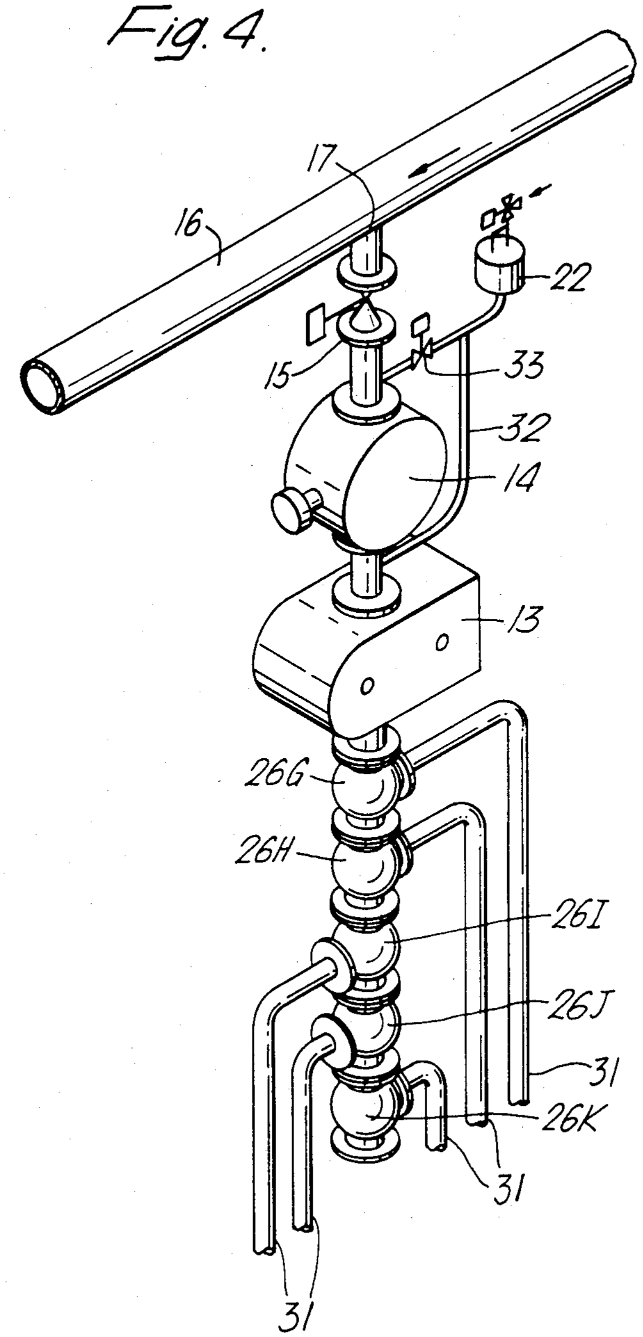
FIG. 4 is a perspective view of part of the apparatus of the invention incorporating the selector valves and the parts between the selector valves and the pipelines.

Referring to FIGS. 3 and 4 there is shown therein a vertical set or stack 25 of five selector valves 26G to K, each in the form of "T" valves having an upper outlet 27, a bottom inlet 28, and a side inlet 29. The upper outlet 27 and bottom inlet 28 of successive valves 26 are connected together. The side inlet 29 of each selector valve 26 is connected by means of a respective permanently positioned line 31 via an air eliminator 30 (see FIG. 5) and a strainer 35 (see FIG. 5) with a component tank 10. However, if desired, one or more of the selector valves 26 may be connected to a hose exchange 18.

The upper outlet 27 of the upper selector valve 26G is directly connected to the positive displacement pump 13 and the upper outlet of the positive displacement pump 13 is connected to the meter 14. The upper outlet of the meter 14 is connected to the check valve 15 and hence to the injection point 17A in the blend header 16. A bypass 32 is provided around the meter 14 and connected to the bypass 32 is the air eliminator 22, the air eliminator being arranged so as to be above the meter 14. A valve 33 is provided in the bypass 32 between the air eliminator 22 and the check valve 15. There may if desired be a drain outlet 34 at the bottom of the stack of selector valves 26.

Figure 5:
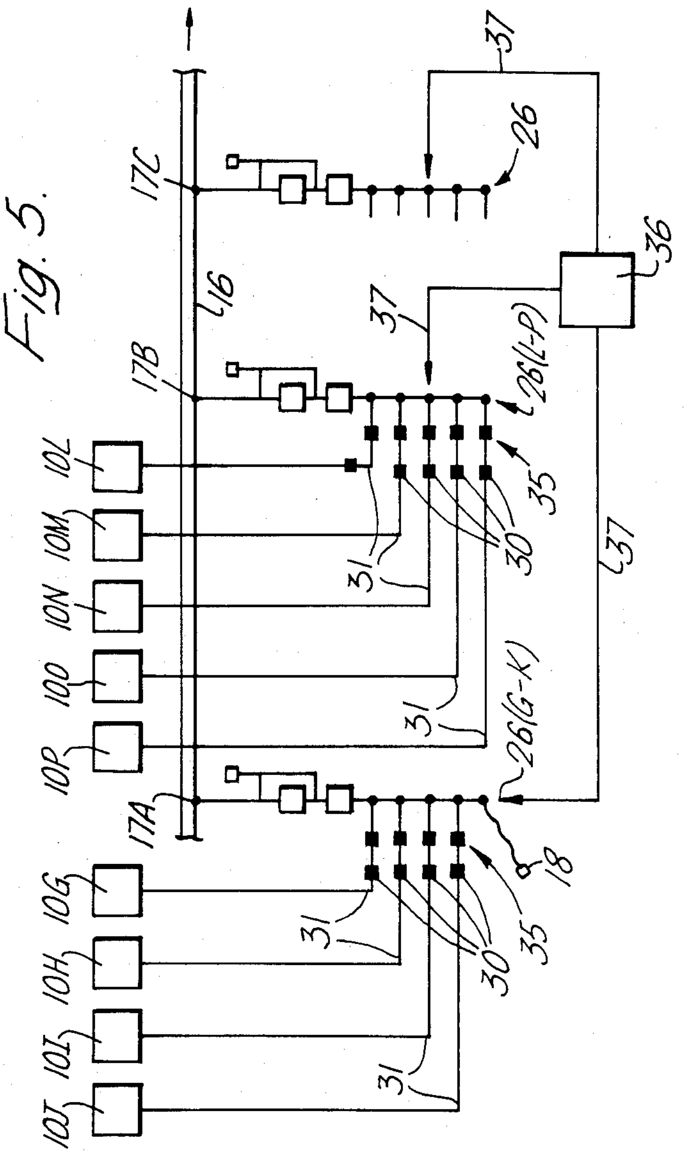
FIG. 5 is a diagrammatic side view of the apparatus of FIGS. 3 and 4 incorporated in an in-line blending plant.

There may be provided, if desired, an arrangement similar to FIGS. 3 and 4 to supply a component to each injection point 17A to F of the blend header 16 (see FIG. 5).

The selector valves 26 may be hand operated but it is preferred that they are motor driven, the motors of each selector valve 26 being controlled by a control unit 36 via control lines 37.

In use, let us say (from FIG. 5) that it is desired to inject at injection point 17A a component I from tank 10I and, at injection point 17B, a component L from tank 10L.

Referring now to FIG. 3 the selector valves 26G, H J and K are set by hand or by control means 36 in the positions shown in which their bottom inlets 28 and upper outlets 27 are interconnected. However, the selector valve 26I is controlled so as to interconnect the side inlet 29I to its upper outlet 27I. Thus component I can flow from component tank 10I through strainer, through the side inlet 29I of a selector valve 26I out of the upper outlet 27I of selector valve 26I, and through selector valves 26H and 26G to the pump 13 where it is pumped through the meter 14 and valve 15 to the injection point 17A. The metering and control of the positive displacement pump is carried out as normal in in-line blending.

A similar process takes place in stack 25B to pass component L from tank 10L to injection point 17B.

When it is desired to change from the supply of component I to another component, say component J, the pump 13 is stopped and the valves 15 and 33 are closed. Air is then introduced into the air eliminator 22 and the air pressure forces component I back through the bypass 32, through the positive displacement pump 13 down through selector valves 26G and H and out of the side inlet 29I of selector valve 26I. Any of component I remaining in the meter 14 can be allowed to drain naturally or a small amount of air may be allowed to bleed through the valve 33. Because of the vertical orientation of the various components any component I remaining of the walls will tend to drain naturally towards the side inlet 29I of valve 26I. Any air entering the line connected to the side inlet 29I can be removed by the relevant air eliminator 30.

After a predetermined period of time the valve 26I is controlled so as to rotate and interconnect its bottom inlet 28I and upper outlet 27I. If desired any further component I can be drained out of the system through the drain outlet 34. In normal use this will not be necessary and the valve 26J is then rotated so as to interconnect its side inlet 29J and upper outlet 27J to allow the component from tank 10J to pass through the pump 13. This operation is initially carried out by allowing air which is in the system to bleed out through the air eliminator 22. It will be understood therefore that component J will initially pass up through the pump 13 and bypass the meter 14 through the bypass 32 to the air eliminator 22. When it reaches that point, and this can be easily determined, the valves 33 and 15 can be opened to begin inserting component J into the blend header 16 at the injection point 17A. It will be understood that any of the component I which is initially washed off the wall by component J will pass into the sump of the air eliminator 22 and remain there until the component supply is changed once again when the air supplied to the air eliminator 22 will tend to blow this contaminated mixture back.

Thus, the necessity for use of the hose exchange has been eliminated for except exceptional circumstances when an unusual component is to be added through one of the selector valves, for example selector valve 26K can be connected to a hose connector rather than to a particular tank.

Because of the construction of the apparatus the strainer 35 is no longer immediately adjacent the pump and can be provided in the line feeding to the relevant side inlets 29 of the selector valves 26.

The apparatus lends itself to automatic control since the selector valves 26 are motor operated and can be controlled by means of the central control means 36 without the necessity to deal with a hose exchange. Because of the vertical arrangement of the selector valves pump and meter, the component can be allowed to drain away and the supply of air to the air eliminator 22 will effectively push back the component.

I claim:

1. An in-line blender for blending components in the form of liquid or other fluent materials, comprising:

a pipeline having a plurality of injection points;

a respective set of selector valves in series with and adjacent to one another connected to each injection point, each selector valve being movable between a first position for connecting an outlet of the selector valve with a respective component supply, and a second position for interconnecting the selector valve with the adjacent downstream and upstream selector valves, the selector valve of each set of selector valves which is furtherst downstream being connected to a metering apparatus and thence to the associated injection point; and means for controlling the selector valves, so that only one of the selector valves in each set of selector valves is in the first position and the others are in the second position during operation and so that, for each set of selector valves, the component from said only one of the selector valves is metered to the associated injection point.

2. An in-line blender as claimed in claim 1 wherein the selector valves are "T" valves and the selector valves in each set are arranged vertically above one another.

3. An in-line blender as claimed in claim 2 further comprising a drain tap, provided at the bottom of each vertically arranged set of selector valves to assist drainage of the system.

4. An in-line blender as claimed in claim 1 wherein the metering apparatus comprises a positive displacement pump and a meter connected vertically above each set of selector valves.

5. An in-line blender as claimed in claim 4 further comprising a bypass mounted around each meter, so that the majority of air provided downstream of the meter to clean the system will bypass the meter and, when the system is filling up again, the majority of the component will initially pass around the meter.

6. An in-line blender as claimed in claim 5 further comprising a member provided above each meter, so that air may be inserted through the member and so that the air which has been inserted is vented when the apparatus is reconnected to pass the air to be blended in order to prevent the air from passing into the pipeline.

7. An in-line blender as claimed in claim 1 further comprising a strainer provided between each selector valve and its component supply.

* * * * *